United States Patent [19]

Takabatake

[11] Patent Number: 5,246,639
[45] Date of Patent: Sep. 21, 1993

[54] METHOD FOR PRODUCING CARBON-CARBON COMPOSITE MATERIALS

[75] Inventor: Minoru Takabatake, Ibarakiken, Japan

[73] Assignee: Petoca Ltd., Tokyoto, Japan

[21] Appl. No.: 711,354

[22] Filed: Jun. 4, 1991

Related U.S. Application Data

[63] Continuation of Ser. No. 399,038, Aug. 28, 1989, abandoned, which is a continuation-in-part of Ser. No. 157,563, Feb. 19, 1988, abandoned.

[30] Foreign Application Priority Data

Feb. 20, 1987 [JP] Japan .................. 62-35676

[51] Int. Cl.$^5$ ............................... B05D 3/02
[52] U.S. Cl. .................. 264/29.5; 264/29.2; 264/29.6; 423/447.2; 423/447.7
[58] Field of Search .............. 264/29.2, 29.6, 29.5, 264/29.7; 423/445, 447.1, 447.2, 447.4, 447.6, 449, 460, 447.7

[56] References Cited

U.S. PATENT DOCUMENTS

| | | | |
|---|---|---|---|
| 3,720,536 | 3/1973 | Scola et al. | 423/447.1 |
| 3,814,642 | 6/1974 | Araki et al. | 156/60 |
| 3,888,958 | 6/1975 | Juntgen et al. | 423/449 |
| 3,917,884 | 11/1975 | John | 423/449 |
| 4,026,788 | 5/1977 | Mchenry | 264/29.2 |
| 4,100,314 | 7/1978 | Wallouch | 423/449 |
| 4,321,298 | 3/1982 | Shaffer | 423/447.2 |
| 4,374,114 | 2/1983 | Kim et al. | 423/447.1 |
| 4,525,337 | 6/1985 | Jamet et al. | 423/449 |
| 4,554,024 | 11/1985 | Zimmer et al. | 427/227 |
| 4,659,624 | 4/1987 | Zeager et al. | 264/29.2 |
| 4,745,008 | 5/1988 | Plotzker et al. | 427/228 |

FOREIGN PATENT DOCUMENTS

| | | |
|---|---|---|
| 1930713 | 1/1970 | Fed. Rep. of Germany . |
| 2165029 | 8/1972 | Fed. Rep. of Germany . |
| 3234777 | 3/1984 | Fed. Rep. of Germany . |
| 52-52912 | 4/1977 | Japan . |
| 59-107913 | 6/1984 | Japan .................. 423/449 |
| 60-127265 | 7/1985 | Japan .................. 264/29.2 |

*Primary Examiner*—Jeffery Thurlow
*Assistant Examiner*—Mathieu Vargot
*Attorney, Agent, or Firm*—Armstrong, Westerman, Hattori, McLeland & Naughton

[57] ABSTRACT

A method for producing high density, high strength carbon-carbon composite material, is provided by using pitch-based carbonaceous fibers carbonized at a temperature lower than 2200° C. or structures, including said carbonaceous fibers as a principal constituent, as a reinforcement material, impregnating said reinforcement material with a carbonaceous material such as pitch or the like and then heat treating said impregnated material.

3 Claims, No Drawings

METHOD FOR PRODUCING CARBON-CARBON COMPOSITE MATERIALS

This application is a continuation of application Ser. No. 399,038, filed on Aug. 28, 1989, now abandoned, which is a continuation-in-part of Ser. No. 157,563, filed Feb. 19, 1988, now abandoned.

BACKGROUND OF THE INVENTION

1. Field of the Invention

This invention relates to a method for producing carbon-carbon composite materials obtained by impregnating pitch based carbonaceous fibers, as a reinforcement material, with a carbonaceous material such as pitch or the like and then heat treating the impregnated material at a high temperature in an inert gas atmosphere.

More specifically, it relates to a method for producing, high density, high strength, carbon-carbon composite materials useful in mechanical parts, electric or electronic parts by taking advantage of their high strength, thermal shock performance, chemical resistance hard wearing property and so forth.

2. Description of the Prior Art

It has been known that high density, high strength carbon-carbon composite materials can be produced by impregnating reinforcement material such as high strength, high modulus carbon fibers wound up to a desired shape or structures comprising carbon fibers as a principal material, with a carbonaceous material such as a thermosetting resin or a pitch which is a precursor of a carbon matrix, carbonizing the impregnated material in an inert gas atmosphere and if necessary graphitizing thus carbonized material.

However, fatal phenomena of cracking and detachment exist on the boundary between the reinforcement materials and the carbon matrix. As a result the mechanical strength of produced carbon-carbon composite materials was not sufficient.

On that account, it is necessary to repeat the process of impregnation/carbonization 5-6 times or more in order to get a high performance carbon-carbon composite material which has properties of high density, high strength and so forth.

In such production method, since impregnation and carbonization steps are repeated, it is necessary to expend much time and the process becomes more complicated. Moreover, there has been a further demerit that the product becomes much more expensive, for extension of working time of an electric furnace during the step of carbonization.

Further a conventional carbon-carbon composite material is weak in the adhesion on the boundary between carbon fibers as a reinforcement material and a carbon matrix. With the object of improving these drawbacks and increasing the adhesion, it has been done that the surfaces of carbon fibers are coated with various kinds of reagents.

However, there have been problems that the heat-treated product of the reagent becomes an impurity of resulting carbon-carbon composite material and reduces the purity as a carbon material. For that reason, the resistance to chemicals and heat is lowered. It is disclosed in Japanese laid open patent application No. Sho 52-52912 that in order to solve the above-mentioned problem, it is effective to use an organic polymer, which is the same material as raw organic fibers for producing carbon fibers, for a carbonaceous material as a precursor of carbon matrix; i.e. when polyacrylonitrile (PAN) based carbon fibers are used as a reinforcement material, the application of a polyacrylonitrile derived resin is effective, and when pitch based carbon fibers are used as a reinforcement material the application of pitch is effective.

According to a method of Japanese laid open patent application No. Sho 52-52912, a carbon matrix obtained by carbonizing a carbonaceous material shows nearly the same property with the carbon fibers as a reinforcement material. It provides some effectiveness to improve the adhesion between the reinforcement material and carbon matrix.

However, a carbonaceous material as a precursor of carbon matrix gives rise to volume shrinkage during the process of carbonization and graphitization. If rigid carbon fibers exist in the matrix precursor, crack and detachment are generated on the boundary between the carbon fibers and carbon matrix because the volume shrinkage of the matrix precursor differs from that of the carbon fiber during heat treatment at a high temperature in an inert gas atmosphere. Furthermore, the volume shrinkage of the matrix precursor does not always occur uniformly. Namely, since there is a large difference in orientation of carbon between that of carbon fibers as a reinforcement material and that of a carbonaceous material as a precursor of carbon matrix, there is a difference in each thermal property during the early stage of carbonization and generation of crack and detachment occurs, and so a secondary reinforcement treatment has been still necessary.

U.S. Pat. No. 3,814,642 discloses that the oxidized organic fiber or the oxidized and slightly carbonized fiber, which has the ether-bonded type oxygen content of from 3 to 15% by weight, is blended with an organic binding material and heat treated in order to increase the mechanical strength of the resulting carbon shaped article by carbon-oxygen-carbon (C—O—C) bonds.

But, since the organic fiber, especially pitch based fiber, including oxygen is very brittle and the processability for such as winding is very poor, the strength of the resulting carbon-carbon composite material is still insufficient.

Japan laid open patent application No. Sho 59-107913 discloses to use carbon fibers having essentially no functional group such as carboxyl group, carbonyl group, and hydroxy group. Since there is no effect of functional group in the phenolic resin shaped body, binding of carbon fibers and a phenolic resin is in the relatively weak state. And if these shaped bodies are subjected to carbonization treatment, the boundary between the phenolic resin derived carbon and carbon fibers, where binding is relatively weak as above-mentioned, is locally detached during the early stage of carbonization treatment.

On this account, local cracks are generated within shaped bodies during the carbonization treatment, but fatal detachments are not observed at the surface of the shaped bodies. However, since the problem of detachments caused by shrinkage is not essentially resolved, the strength of the resulting carbon-carbon composite material is still insufficient.

It is an object of the present invention to provide a carbon-carbon composite material superior in mechanical strength, resistance to heat and chemicals, hard wearing property by overcoming the above-mentioned drawbacks, namely by greatly reducing the fatal crack or detachment which occur on the boundary between the reinforcement material and the carbon matrix during the early stage of carbonization in the production process of carbon-carbon composite material and improving the adhesion of the boundary between the reinforcement material and the carbon matrix.

Another object of the present invention is to provide a process for producing carbon-carbon composite materials easily and at lower cost in commercial scale.

SUMMARY OF THE INVENTION

This invention resides in a method for producing a high density, high strength carbon-carbon composite material which is characterized by using pitch based carbonaceous fibers having been carbonized at a temperature lower than 2200° C., preferably 450°-1400° C. or structures comprising the said pitch based carbonaceous fibers as a principal constituent in the method for producing carbon-carbon composite material by impregnating pitch based carbonaceous fibers obtained from petroleum pitch or coal pitch, as a reinforcement material, with a carbonaceous material such as pitch i.e. petroleum pitch, coal pitch, a thermosetting resin such as phenol resin, furan resin or the like as a precursor of carbon matrix and then heat treating the impregnated product in an inert gas atmosphere at a higher temperature than the carbonization temperature of said carbonaceous fibers. Said carbonaceous fibers show volume shrinkage of 5-60%, preferably 10-50% during the high temperature heat treatment carried out afterwards. A value of the volume shrinkage means the ratio of the volume of carbon fiber as a reinforcement material after the heat treatment to the volume before the heat treatment.

Further, said carbonaceous fibers have a tensile strength of 50-2500 MPa, an elongation of 0.5-8.0%, a tensile modulus of 4-400 GPa and, in addition, a capability of increasing both tensile strength and tensile modulus up to 1.1 times or more of the values in the precedent step and up to a value of 400 GPa or more in the tensile modulus, by the high temperature heat treatment carried out afterwards.

DESCRIPTION OF THE PREFERRED EMBODIMENT

This invention relates to a method for producing high density, high strength carbon-carbon composite material, in which by using, as a reinforcement material, pitch based carbonaceous fibers carbonized at a low temperature or structures formed by using the said carbonaceous fibers as their principal constituent, it has become possible to mitigate the strain which is a cause of crack and detachment caused by shrinkage during the high temperature heat treatment of a precursor of carbon matrix. In the present invention, fatal crack and detachment on the boundary between a reinforcement material and a carbon matrix are extremely reduced.

The carbonaceous fibers, used in the present invention as a reinforcement material, are precursor fibers which becomes petroleum pitch based or coal pitch based high strength and high modulus carbon fibers. Said carbonaceous fibers or structures formed by using the said carbonaceous fibers as principal constituent easily becomes high strength and high modulus by a high temperature heat treatment without stretching.

In case of carbon fibers in which a precursor is cellulose or PAN, it is necessary to heat treat at high temperature with stretching in order to increase strength and modulus. High strength, high modulus fibrous structures in which a precursor is cellulose or PAN must be made into structures such as woven fabrics only after these precursors have been heat treated at a high temperature with stretching. Whereas from the carbonaceous fibers used as a reinforced material in the present invention, high strength, high modulus fiber structure can be easily obtained by a high temperature heat treatment even without applying stretching after being formed into structures.

Accordingly, it is possible to make the difference of characteristic properties between carbon matrix precursor and reinforcement material smaller.

Accordingly, by using pitch based carbonaceous fibers having been carbonized at a temperature lower than 2200° C. or structures formed by using the said carbonaceous fibers in the present invention, strain which is a cause of crack or detachment generated on the boundary between reinforcement material and carbon matrix can be mitigated. Because during the impregnated material is heat treated at high temperature, the volume shrinkage of the carbon matrix precursor is offset by the volume shrinkage of the said carbonaceous fibers and then it becomes possible to neglect the residual stress existing near the boundary between the said carbonaceous fibers and carbon matrix. Thus it will become possible to produce high density, high strength carbon-carbon composite materials actually by reducing the generation of crack and detachment to a much smaller degree without applying a secondary reinforcement treatment.

Further, it is possible to enlarge the adhesion on the boundary between the reinforcement material and the carbon matrix, compared with conventional carbon-carbon composite material, by arranging the relation $(Sm-Sf)$, which is a difference between the volume shrinkage rate of the said carbonaceous fibers $(Sf)$ and the volume shrinkage rate of the carbonaceous material $(Sm)$ such as a pitch or the like as a carbon matrix precursor during the high temperature heat treatment, so as to fall in the range of 0-45%, preferably 0-20%, because the force of shrinking of the carbon matrix can be applied to increase the adhesion on the boundary in the carbon-carbon composite. In case of the present invention it has become possible to obtain a strong adhesion on the boundary even without coating with a special surface treating reagent upon the carbonaceous fibers as a reinforcement material and it is possible to produce carbon-carbon composite materials having high purity of carbon, which is superior in resistance to heat, chemical and so fourth.

As one of the superior properties of the present invention process, simplification of the steps of impregnation, (carbonization and graphitization) can be mentioned. By using the method of the present invention, there is no need of carrying out repeated steps of impregnation and a high temperature heat treatment i.e. a secondary reinforcement treatment. It is possible to gain a nearly sufficient density by a single series of treatment. This density is in the range of 1.45-2.05 g/cc when there is no hollow part to which impregnation is impossible, in the carbonaceous fibers as reinforcement fibers.

As a carbonaceous material such as a pitch or the like, used in the present invention, a certain intermediate pitch for producing the pitch based carbonaceous fibers carbonized at a temperature lower than 2200° C. as reinforcement materials can be mentioned.

According to the process of the present invention, said carbonaceous fibers or structures formed by using the said carbonaceous fibers as a principal constituent which are arranged in a desired shape or a wound up form are impregnated with a carbonaceous material, such as a pitch or the like, under a reduced pressure, under a pressurized state or under an alternately-reduced-pressurized state and if necessary, press-molding is applied. Then, in an inert gas atmosphere, the high temperature heat treatment is carried out under a normal pressure or a high pressure condition.

In order to increase resistance to heat, chemicals and the like, it is preferable to heat treat at a temperature higher than 1000° C.

More detailed explanation will be given to the present invention by way of specific examples but it is not intended to limit its scope.

SPECIFIC EXAMPLE 1

Petroleum pitch based carbonaceous fibers heat treated at 500° C. in argon gas atmosphere, thereby preventing a chemical treatment of the fibers producing the ether-type linkages of U.S. Pat. No. 3,814,642, were unidirectionally aligned and a petroleum pitch which was an intermediate pitch for producing the said carbonaceous fibers (having a softening point of 150° C., a residual carbon of 53% by weight, and a density of 1.28) was melted. After evacuation and impregnation under a reduced pressure of 2–10 mmHg, substitution with argon gas was carried out. Subsequently, pressure was elevated up to 1 MPa and impregnation treatment was carried out under a pressurized state. Resulting sample was heat treated up to 600° C. at 2.5° C./min. in argon gas atmosphere at 15 MPa (holding time was 2 hours). Further heat treatment was continued in argon gas atmosphere (1 atm) up to 2000° C.

The characteristic properties of thus obtained carbon-carbon composite material are shown below (volume percentage of carbon fibers, 56%)

| Bulk density | 2.01 g/cc |
| --- | --- |
| Flexural strength | 470 MPa |
| Flexural modulus | 200 GPa |

The petroleum pitch based carbonaceous fibers carbonized at 500° C. showed about 46% of volume shrinkage due to the dimensional changes in the both directions of fiber axis and fiber diameter, when they were heat treated up to 2000° C. without stretching.

Further, the petroleum pitch used as a matrix carbon precursor was heat treated up to 600° C. at 2.5° C./min. in argon gas atmosphere at 15 MPa and further heat treated up to 2000° C. in argon gas atmosphere, and resulting pitch-based carbon material showed ultimately carbon yield of 80% by weight and true density of 2.17 g/cc.

Accordingly, this means that this petroleum pitch showed about 52.8% of volume shrinkage during the heat treatment up to 2000° C.

There was a difference of volume shrinkage of about 6.8% between the carbonaceous fibers as a reinforcement material and the petroleum pitch as a precursor of carbon matrix, during the heat treatment up to 2000° C.

When the cross-sectional surface of the sample of this specific example was observed using a polarized light microscope, no crack and detachment were observed on the boundary between the reinforcement material and the carbon matrix.

SPECIFIC EXAMPLE 2

Petroleum pitch based carbonaceous fibers heat treated up to 1000° C. were put in order by pulling in unidirection and processed as in specific example 1 and a carbon-carbon composite material was thus prepared. The characteristic properties of this sample are shown below.

| Bulk density | 1.83 g/cc |
| --- | --- |
| Flexural strength | 400 MPa |
| Flexural modulus | 200 GPa |

The petroleum pitch based carbonaceous fibers carbonized at 1000° C. indicated, when heat treated up to 2000° C. without stretching, volume shrinkage of about 10.5% due to the dimensional changes in the both directions of fiber axis and fiber diameter.

The petroleum pitch used as a precursor of carbon matrix showed volume shrinkage of about 52.8% during the course of heat treatment up to 2000° C. similarly as in specific example 1.

Accordingly, the difference of volume shrinkage between the carbonaceous fibers as a reinforcement material and the petroleum pitch as a precursor of carbon matrix during the process of heat treatment carried out up to 2000° C. was 42.3%.

The cross-sectional surface of the sample of this specific example was observed using a polarized light microscope and there was no crack and detachment found.

COMPARATIVE EXAMPLE

Petroleum pitch based carbon fibers heat treated at a temperature of 2500° C. were unidirectionally aligned and the petroleum pitch which was an intermediate pitch for producing the said carbon fibers (having a softening point of 150° C., a residual carbon of 53% by weight and a density of 1.28 g/cc) was melted and carbon-carbon composite material was produced similarly as in specific example 1 (sample No. 1). When the cross-sectional surface of this sample was observed using a polarized light microscope, there were found cracks and detachments on the boundary of the reinforcement material and the carbon matrix. These cracks and detachments were observed already after heat treatment under pressurized condition at 600° C.

One and two re-impregnations and re-heat treatment were applied to sample No. 1, to obtain two kinds of samples which were subjected to secondary reinforcement once and twice (sample No. 2 and 3, respectively). The characteristic properties of each samples are shown in Table 1.

When the petroleum pitch based fibers heat treated at 2500° C. as used in the comparative example was heat treated again at 2000° C. in a tensionless state, there was observed no dimensional change in both the directions of fiber axis and fiber diameter and no change of volume. Namely, this means that the difference of volume shrinkage between the heat treated fibers as a reinforcement material and the petroleum pitch as a precursor of carbon matrix during the process of heat treatment up to 2000° C. was about 52.8%.

TABLE 1

|  | sample No. | | |
|---|---|---|---|
|  | 1 | 2 | 3 |
| Bulk density (g/cc) | 1.43 | 1.68 | 1.76 |
| Flexural strength (MPa) | 100 | 260 | 380 |
| Flexural modulus (GPa) | 150 | 200 | 245 |

EFFECTIVENESS OF THE INVENTION

According to the method of the present invention, it has become possible to produce carbon-carbon composite material in which the generation of crack and detachment on the boundary of a reinforcement material and a carbon matrix is reduced to a much smaller degree. Since carbonaceous fibers carbonized at low temperature are used as a reinforcement material, it has become possible to reduce the cost of reinforcement material and to produce carbon-carbon composite material easily and at lower cost in commercial scale.

According to the method of the present invention, it is possible to cut off any secondary reinforcement treatment such as re-impregnation or the like in the production of carbon-carbon composite materials.

What is claimed is:

1. A method for producing high density, high strength carbon-carbon composite materials reinforced by carbon fibers, consisting of impregnating pitch based carbonaceous fibers, which have been carbonized in an inert gas atmosphere at a temperature of between 450° C. and 2200° C. and which have not been subjected to any treatment for chemically introducing ether linkages, or structures which contain the said pitch based carbonaceous fibers as a principal constitutent, with a carbonaceous material and thereafter heat treating the resulting impregnated product at a high temperature in an inert gas atmosphere, wherein there is a relationship of $$Sm - Sf = [0]6.9 \text{ to } 45\%$$

between the volume shrinkage (Sf) of the said pitch based carbonaceous fibers during the said high temperature heat treatment and the volume shrinkage (Sm) of the said carbonaceous material during the said high temperature heat treatment.

2. A method for producing a carbon-carbon composite material according to claim 1, wherein the said pitch based carbonaceous fibers show the volume shrinkage (Sf) of 5-60% during the said high temperature heat treatment and have a tensile strength in the range of 50-2500 MPa, an elongation in the range of 0.5-8.0 %, a tensile modulus of elasticity in the range of 4-400 GPa and a capability of increasing their tensile strength and tensile modulus of elasticity to 1.1 times or more, up to 1.5 GPa or more in tensile strength and 400 GPa or more in tensile modulus of elasticity, by the high temperature heat treatment.

3. A method for producing a carbon-carbon composite material according to claim 1, wherein the said carbon-carbon composite material has a bulk density of 1.45-2.05 g/cc and is produced by a single series of impregnation and high temperature heat treatment.

* * * * *